US009097187B2

(12) United States Patent
Rofka et al.

(10) Patent No.: US 9,097,187 B2
(45) Date of Patent: Aug. 4, 2015

(54) METHOD FOR OPERATING A GAS TURBINE POWER PLANT WITH EXHAUST GAS RECIRCULATION

(75) Inventors: Stefan Rofka, Nussbaumen (CH); Jürgen Hoffmann, Untersiggenthal (CH); Eribert Benz, Birmenstorf (CH); Frank Sander, Rieden (CH); Martin Nicklas, Spiegel b. Bern (CH)

(73) Assignee: ALSTOM TECHNOLOGY LTD., Baden (CH)

( * ) Notice: Subject to any disclaimer, the term of this patent is extended or adjusted under 35 U.S.C. 154(b) by 135 days.

(21) Appl. No.: 13/459,811

(22) Filed: Apr. 30, 2012

(65) Prior Publication Data

US 2012/0291445 A1 Nov. 22, 2012

(30) Foreign Application Priority Data

Apr. 28, 2011 (CH) .................................... 0721/11

(51) Int. Cl.
*F02C 3/14* (2006.01)
*F02C 3/13* (2006.01)
(Continued)

(52) U.S. Cl.
CPC ... *F02C 3/34* (2013.01); *F02C 3/13* (2013.01); *F02C 6/18* (2013.01); *F05D 2220/60* (2013.01); *F05D 2260/61* (2013.01); *F05D 2260/85* (2013.01); *F05D 2270/08* (2013.01); *Y02E 20/14* (2013.01); *Y02E 20/16* (2013.01)

(58) Field of Classification Search
CPC ........... F02C 3/34; F02C 3/13; F05D 2260/85
USPC ................................ 60/39.52, 39.182, 39.17
See application file for complete search history.

(56) References Cited

U.S. PATENT DOCUMENTS 3,785,145 A * 1/1974 Amann ........................ 60/39.24
5,634,327 A 6/1997 Kamber et al.
(Continued)

FOREIGN PATENT DOCUMENTS

DE 10 2004 039 164 A1 3/2006
EP 0718470 A2 6/1996
(Continued)

OTHER PUBLICATIONS

International Search Report issued on Jul. 12, 2011, by European Patent Office as the International Searching Authority for Swiss Application No. 00721/11.
(Continued)

*Primary Examiner* — Phutthiwat Wongwian
*Assistant Examiner* — William Breazeal
(74) *Attorney, Agent, or Firm* — Buchanan Ingersoll & Rooney PC

(57) ABSTRACT

An exemplary method is disclosed for operating a gas turbine power plant with exhaust gas recirculation, in which the exhaust gas recirculation is, for example, disengaged during starting and shutting down of the gas turbine, and in which the engaging or disengaging of the exhaust gas recirculation can be carried out in dependence upon an operating state of the gas turbine. An exemplary gas turbine power plant with exhaust gas recirculation is also disclosed which can include a control element, the closing speed of which is such that the control element can be closed within a time which is less than a time for exhaust gases to flow from the turbine through an HRSG.

17 Claims, 3 Drawing Sheets

2
3
11
27
21
32
28
1
6
8
7
9
19
24
EGB
EGC
EGS
EGB
4
5
25
30
29
10
13
26
16
14

(51) Int. Cl.
*F02C 6/18* (2006.01)
*F02C 3/34* (2006.01)

(56) References Cited

U.S. PATENT DOCUMENTS

| | | | | |
|---|---|---|---|---|
| 6,070,405 | A * | 6/2000 | Jerye et al. | 60/773 |
| 7,536,252 | B1 | 5/2009 | Hibshman, II et al. | |
| 8,424,283 | B2 | 4/2013 | Chillar et al. | |
| 2008/0010967 | A1* | 1/2008 | Griffin et al. | 60/39.182 |
| 2009/0120089 | A1 | 5/2009 | Chillar et al. | |
| 2009/0129914 | A1 | 5/2009 | Simpson | |
| 2009/0145126 | A1 | 6/2009 | Chillar et al. | |
| 2009/0229263 | A1 | 9/2009 | Ouellet et al. | |
| 2009/0292436 | A1* | 11/2009 | D'Amato et al. | 701/100 |
| 2010/0058758 | A1 | 3/2010 | Gilchrist, III et al. | |
| 2010/0115960 | A1 | 5/2010 | Brautsch et al. | |
| 2010/0126181 | A1* | 5/2010 | Ranasinghe et al. | 60/782 |

FOREIGN PATENT DOCUMENTS

| | | | |
|---|---|---|---|
| EP | 2060772 | A2 | 5/2009 |
| JP | 7-34900 | A | 2/1995 |
| JP | H11-72027 | A | 3/1999 |
| JP | 2007-182785 | A | 7/2007 |
| JP | 2009-108848 | A | 5/2009 |
| JP | 2010-65694 | A | 3/2010 |
| WO | WO 2008/155242 | A1 | 12/2008 |
| WO | WO 2010/049277 | A1 | 5/2010 |
| WO | 2010/072710 | A2 | 7/2010 |
| WO | 2010/072729 | A2 | 7/2010 |
| WO | WO 2010/139724 | A1 | 12/2010 |

OTHER PUBLICATIONS

The extended European Search Report dated Jun. 6, 2012, issued in corresponding European Patent Application No. 12166079.9. (8 pages).

Notification of Reasons for Refusal issued on Oct. 6, 2014 by the Japanese Patent Office in corresponding Japanese Patent Application No. 2012-96411, and an English translation thereof.

First Office Action issued on Feb. 2, 2015 by the Chinese Patent Office in corresponding Chinese Patent Application No. 201210195222.4, and an English translation thereof.

* cited by examiner

METHOD FOR OPERATING A GAS TURBINE POWER PLANT WITH EXHAUST GAS RECIRCULATION

RELATED APPLICATION

This application claims priority under 35 U.S.C. §119 to Swiss Patent Application No. 00721/11 filed in Switzerland on Apr. 28, 2011, the entire content of which is hereby incorporated by reference in its entirety.

TECHNICAL FIELD

A method and system are disclosed for controlling the start-up of a gas turbine with exhaust gas recirculation, and a gas turbine power plant is disclosed for implementation of the method.

BACKGROUND INFORMATION

The recirculation of exhaust gases is a technology which can be used for a very wide variety of purposes in gas turbines. Thus, exhaust gas recirculation is proposed for the reduction of NOx emissions or for a reduction of the exhaust gas which is to be discharged, for example. During the recirculation of exhaust gases in a gas turbine, a significant proportion of the exhaust gas is tapped from the overall exhaust gas flow and after cooling and scrubbing can be fed to the intake mass flow of the gas turbine or to the compressor, wherein the recirculated exhaust gas flow is mixed with fresh air, and this mixture is then fed to the compressor.

As a result of exhaust gas recirculation, the carbon dioxide partial pressure in the exhaust gases can be increased to reduce the power losses and efficiency losses of power plants with carbon dioxide separation. Furthermore, exhaust gas recirculation has been proposed with the aim of reducing the oxygen concentration in the intake gases of gas turbines in order to reduce the NOx emissions as a result.

For exhaust gas recirculation, U.S. Pat. No. 7,536,252 B1, for example, describes a method for controlling an exhaust gas recirculation flow of a turbomachine which is fed back to the intake of the turbomachine via an exhaust gas recirculation system. In this method, a nominal exhaust gas recirculation proportion is determined, wherein the exhaust gas recirculation proportion is defined as the proportion of the exhaust gas flow to the intake flow of the turbomachine, and the actual value is adjusted to the nominal value.

A method for operating a gas turbine with exhaust gas recirculation is known from US2009/0145126, in which the exhaust gas composition is determined and a control element allows for a control of the exhaust gas recirculation in dependence upon the measured exhaust gas composition. A control of this type can lead to unstable controlling, especially during start-up or operation with fast transients in the low load range since the exhaust gas composition depends heavily upon the proportion of recirculated exhaust gases. In addition, the exhaust gas composition, or the permissible composition of the intake gases of the gas turbine, is heavily dependent upon the operating point of the gas turbine so that a reliable operation of the gas turbine with exhaust gas recirculation becomes more difficult for specific operating states.

In order to ensure that no combustible or explosive fuel-air mixtures are left behind in the recirculation line, it has been proposed to purge the recirculation lines before starting a gas turbine, for which additional valves and lines are used. For example, a purge system for purging an exhaust gas recirculation system is known from EP2060772.

SUMMARY

A method is disclosed for operating a gas turbine power plant having exhaust gas recirculation, a gas turbine, a heat recovery steam generator and an exhaust gas splitter which divides exhaust gases of the gas turbine power plant into a first exhaust gas flow, for recirculation into an intake flow of the gas turbine, and into a second exhaust gas flow, for discharge to an environment outside of the gas turbine, and also having a control element for controlling the first exhaust gas flow, the method comprising closing the control element until achieving a permissive condition in which an entire exhaust gas flow of the gas turbine power plant is discharged as the second exhaust gas flow to the environment, and opening the control element only after achieving the permissive condition in order to recirculate a portion of the exhaust gas as the first exhaust gas flow into the intake flow.

A gas turbine power plant with exhaust gas recirculation is disclosed, comprising a gas turbine with a governor, a heat recovery steam generator, an exhaust gas splitter for dividing the exhaust gases into a first exhaust gas flow for recirculation into an intake flow of the gas turbine, and into a second exhaust gas flow for discharging to an environment outside of the gas turbine, and a control element for controlling the first exhaust gas flow, wherein the control element has a closing speed which is such that the control element can be closed within a time which is less than a time for exhaust gases to flow from the gas turbine through the HRSG to the exhaust gas splitter.

A gas turbine power plant with exhaust gas recirculation, comprising a gas turbine with a governor, a heat recovery steam generator, an exhaust gas splitter for dividing the exhaust gases into a first exhaust gas flow for recirculation into an intake flow of the gas turbine, and into a second exhaust gas flow for discharging to an environment, a control element for controlling the first exhaust gas flow, and a fast-acting shutoff valve or a fast-acting shutoff flap located in a connecting region of an exhaust gas recirculation line.

BRIEF DESCRIPTION OF THE DRAWINGS

Exemplary embodiments of the invention are described in the following text with reference to the drawings which serve only for explanation and are not to be considered as being limiting. In the drawings.

DETAILED DESCRIPTION

Figure 1:
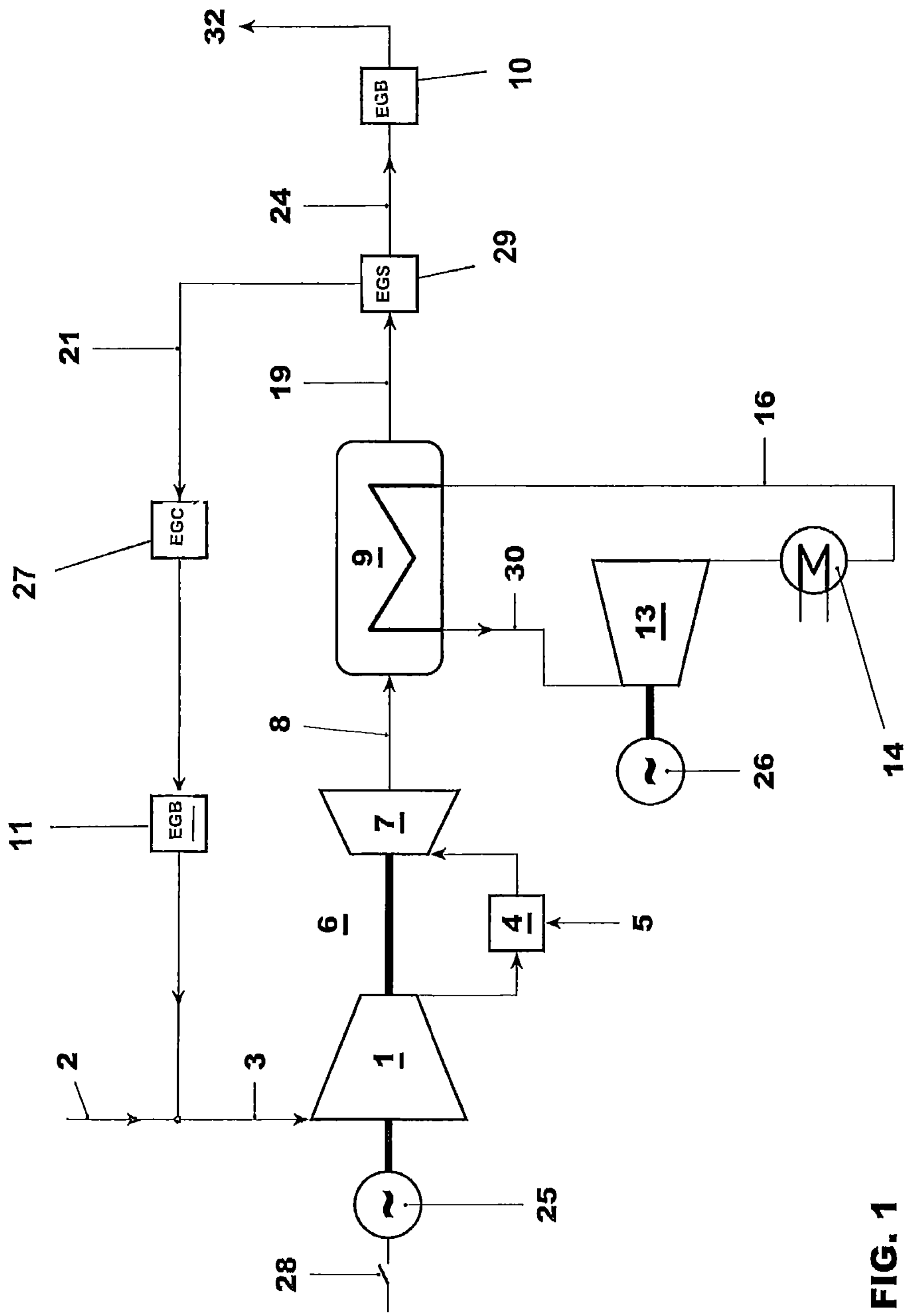
FIG. 1 shows a schematic view of an exemplary gas turbine power plant with recirculation of the exhaust gases.

An exemplary method is disclosed for reliable operation of a gas turbine power plant with exhaust gas recirculation at low load, and also for starting and shutting down of a gas turbine and exhaust gas recirculation.

An exemplary method is disclosed for operating a gas turbine with exhaust gas recirculation, in which the exhaust gas recirculation is disengaged during the starting and shutting down of the gas turbine, and in which the engagement or disengagement of the exhaust gas recirculation is carried out in dependence upon an operating state of the gas turbine.

An exemplary gas turbine power plant as disclosed herein with exhaust gas recirculation, includes a gas turbine, a heat recovery steam generator and an exhaust gas splitter which can divide the exhaust gases of the gas turbine power plant into a first exhaust gas flow, for recirculation into an intake flow of the gas turbine, and into a second exhaust gas flow, for discharging to an environment (i.e., an environment outside of the gas turbine), and also a control element for controlling the first exhaust gas flow. The control element can be held in a closed position until the exceeding of an engagement load so that no exhaust gases find their way into recirculation lines and the entire exhaust gas flow of the gas turbine power plant is discharged as the second exhaust gas flow to the environment (i.e., an environment outside the gas turbine). Not until achieving a permissive condition, for example the exceeding of an engagement load, is the control element opened according to an exemplary method in order to recirculate a portion of the exhaust gases as the first exhaust gas flow into the intake flow. According to further embodiments, a pressure limit value, such as of the combustion chamber or compressor discharge pressure, a limit value of the hot gas temperature or a limit of the fuel mass flow or the position of the fuel control valve, can be provided as a permissive condition.

Depending upon the start-up procedure of the gas turbine, the combustion during the running up to nominal rotation speed can be unstable and additional changes to the boundary conditions may be undesirable. According to one exemplary development of the method, the exhaust gas recirculation can therefore be engaged only after achieving the nominal rotational speed.

According to a further exemplary development, the exhaust gas recirculation can be disengaged before or during shutting down of the gas turbine in order to avoid contamination of the exhaust gas recirculation lines with fuel residues.

According to another exemplary development, the exhaust gas recirculation can be shut off when shedding load after a disengagement condition has been fallen short of (i.e., not reached). In a further embodiment, this is a disengagement load.

According to further exemplary embodiments, a pressure limit value, such as of the combustion chamber or compressor discharge pressure, a limit value of the hot gas temperature or a limit of the fuel mass flow or the position of the fuel control valve, can be provided as a disengagement condition.

For example, in the branch of the exhaust gas recirculation lines from the exhaust gas line, provision can be made for a control element which closes before fuel residues find their way into the exhaust gas recirculation lines.

Since the exhaust gas recirculation consumes auxiliary power as a result of blowers and coolers, in one embodiment the exhaust gas recirculation is provided only after generator synchronization or after a defined load point. The exhaust gas recirculation is correspondingly disengaged below a defined load point, (e.g., below a disengagement load). During load shedding, the entire exhaust gas flow of the gas turbine power plant can be discharged as the second exhaust gas flow to the environment below this disengagement load. According to an exemplary embodiment, the exhaust gas recirculation is disengaged only when the generator circuit-breaker opens.

In an exemplary embodiment of the method, the disengagement condition is lower than the engagement condition. For example, the disengagement load is lower than the engagement load in order to avoid frequent engagement and disengagement of the exhaust gas recirculation at low load.

According to a further exemplary embodiment of the method, the engagement load is lower than, or equal to, the minimum load of the gas turbine. As soon as the generator of the gas turbine is synchronized with the network and the generator circuit-breaker is closed, in this method the control element of the exhaust gas recirculation is opened in order to recirculate a portion of the exhaust gases as the first exhaust gas flow into the intake flow.

According to a further exemplary embodiment, the control element of the exhaust gas recirculation is closed upon opening of the generator circuit-breaker. In this case, the entire exhaust gas flow of the gas turbine power plant is discharged as the second exhaust gas flow to the environment as soon as the generator circuit-breaker opens.

At a low load of a gas turbine power plant, low hot gas temperatures can lead to incomplete combustion and CO emissions (carbon monoxide emissions) can increase. In order to avoid a further increase of the CO emissions as a result of exhaust gas recirculation, which leads to oxygen-impoverished fuel gases, the exhaust gas recirculation in an exemplary embodiment is activated only after a load at which the power plant is operated in a steady state for a longer period. This is, for example, about 20 to 30% (e.g., ±10%) of the relative load. At this load, the power plant can be operated with adequate efficiency and the hot gas temperatures are high enough to allow a clean combustion with exhaust gas recirculation.

Depending upon the type of gas turbine, the limit value for activation of the exhaust gas recirculation can lie at up to 50% or 60% (or greater) of the relative load, wherein the relative load is defined as the ratio of delivered power to the potential full-load power at the respective ambient conditions.

When a gas turbine is being shut down, fuel residues can find their way into the exhaust gases. If the exhaust gas recirculation is open, these fuel residues can also find their way into the recirculation lines which then have to be purged in a time-consuming manner with air or another gas before a restart of the gas turbine. In order to avoid this contamination and the purging process, according to an exemplary embodiment of the method, the control element is closed in a shorter time than the exhaust gases require in order to flow from the turbine through the HRSG and to reach the exhaust gas splitter. As a result of a correspondingly fast closing, fuel residues finding their way into the exhaust gas recirculation system is prevented. Purging of the system is therefore not necessary for a restart.

An exemplary gas turbine as disclosed herein can include a compressor, a combustion chamber and a turbine which drives the compressor and delivers useful power. In a further exemplary embodiment of the method, which is provided for application in gas turbines with sequential combustion, such as a gas turbine with a compressor, a first combustion chamber, a high-pressure turbine, a second combustion chamber (sequential combustion chamber) and a low-pressure turbine, the control element for controlling the recirculation flow is closed before, or during, a shutdown of the second combustion chamber. The second combustion chamber can be shut down at low load, whereas the first combustion chamber continues in operation in order to ensure a stable, clean combustion. If the inlet temperature into the second combustion chamber at low load is low, unburnt fuel can leave the combustion chamber and therefore the low-pressure turbine when the second combustion chamber is shut down. This can occur, for example, in the case of load shedding when operating on oil if, after shutting down the combustion chamber, the fuel lines into the burner are additionally purged. In order to prevent fuel residues finding their way via the recirculation line into the compressor intake of the gas turbine, the control element of the recirculation can be closed before the shutting down of the second combustion chamber. Alternatively, the control element, during or shortly after the shutting down of the second combustion chamber, can be closed so quickly that up to its closure possible fuel residues have not yet covered the distance from the combustion chamber to the control element.

According to a further exemplary embodiment, the control element for controlling the recirculation is closed before purging the oil lines of the fuel distribution system of the second combustion chamber so that during the purging process the entire exhaust gas flow of the gas turbine power plant is discharged as the second exhaust gas flow to the environment. After termination of the purging process, the control element can be opened again and a portion of the exhaust gases can be recirculated into the intake of the gas turbine.

In addition to the method, a gas turbine power plant for implementing the method with exhaust gas recirculation is disclosed. An exemplary power plant can include a gas turbine with a governor, a heat recovery steam generator and an exhaust gas splitter which divides the exhaust gases into a first exhaust gas flow, for recirculation into an intake flow of the gas turbine, and into a second exhaust gas flow, for discharging to the environment, and can include a control element for controlling the first exhaust gas flow. This power plant is distinguished by, for example, a control element for controlling the first exhaust gas flow being closed within a time which is less than the time the exhaust gases require in order to flow from the turbine exhaust through the HRSG to the control element. The control element can, for example, be able to close in less than 30 seconds for this purpose. The specified closing time can result from the exhaust gas volumetric flow and the volume of the boiler and exhaust gas lines between the gas turbine and the exhaust gas splitter. The closing time can even be within less than 10 seconds, for example, or any other suitable time.

In an exemplary embodiment, in order to ensure a fast closing of the recirculation line, a fast-acting shutoff valve or a fast-acting shutoff flap can be provided in the inlet region of the recirculation line in addition to the control element for controlling the first exhaust gas flow. This can be advantageous in the case of recirculation lines with large cross-sectional areas since the available control elements can, for example, operate only slowly and a separate fast-acting shutoff valve can be more favorable than providing a control element with the specified closing speed. The fast-acting shutoff flap or the fast-acting shutoff valve can, for example, close in less than 30 seconds. It can close even in less than 10 seconds, for example, or any other suitable time. The region which is directly adjacent to the flow splitter is to be understood as the inlet region of the recirculation line. The fast-acting shutoff valve should, for example, be located at a distance from the flow splitter which is less than two to three times the diameter of the recirculation line.

If there is no provision for a separate fast-acting shutoff valve, the control element can, for example, be arranged in the inlet region of the recirculation line.

Exemplary advantages as discussed herein are applicable not only in the respectively disclosed combinations but also in other combinations or in isolation without departing from the scope of the invention. For example, instead of using a control element, which allows closing of the recirculation line, such as a controllable flap or a valve, a controllable exhaust gas blower or a booster can also be provided as a control element, which is combined with a fast-acting shutoff valve. For simplicity, the controlling of the control element has been described in general. This is representative for closed-loop controlling or open-loop controlling. Different control strategies, such as two-point controlling, controlling with proportional controllers, integral action controllers or IP controllers, are known to those skilled in the art. In addition, different scrubbing methods and treatment methods for the recirculated exhaust gases, such as a gas scrubber, are known to those skilled in the art.

FIG. 1 shows in a schematic view essential elements of an exemplary gas turbine power plant as disclosed herein. The gas turbine 6 includes: a compressor 1, and the combustion air which is compressed therein is fed to a combustion chamber 4 and combusted there with fuel 5. The hot combustion gases are then expanded in a turbine 7. Useful energy which is generated in the turbine 7 is then converted into electrical energy by a first generator 25, for example, which is arranged on the same shaft.

The hot exhaust gases 8 which issue from the turbine 7, for optimum utilization of the energy, still contained therein, in a heat recovery steam generator 9 (HRSG), are used for producing live steam 30 for a steam turbine 13 or for other plants. Useful energy which is generated in the steam turbine 13 is converted into electrical energy by a second generator 26, for example, which is arranged on the same shaft. The water-steam cycle 39 is simplified in the example and shown only schematically with a condenser 14 and feed-water line 16. Different pressure stages, feed-water pumps, etc., are not shown since these are not a subject of the embodiment disclosed.

The exhaust gases from the heat recovery steam generator 9 are split downstream of the heat recovery steam generator 9 in a flow splitter 29 into a first exhaust gas partial flow 21 and into a second exhaust gas partial flow 24. The first exhaust gas partial flow 21 is recirculated into the intake duct of the gas turbine 6 and mixed with ambient air 2 there. The second exhaust gas partial flow 24, which is not recirculated, is discharged to the environment via an exhaust stack 32. In order to overcome the pressure losses in the exhaust gas line, and as an additional way of controlling the splitting of the exhaust gas flows, an exhaust gas blower 11 or a controllable exhaust gas blower 11 can be optionally provided.

In the depicted example, the flow splitter 29 is designed as a control element which allows the inlet into the recirculation line to be closed in order to prevent the entry of fuel residues into the recirculation line.

During operation with recirculation, the recirculated exhaust gas flow 21 is cooled to a little above ambient temperature in an exhaust gas recirculation cooler 27 which can be equipped with a condenser. A booster or exhaust gas blower 11 for the recirculation flow 21 can be arranged downstream of this exhaust gas recirculation cooler 27. This recirculated exhaust gas flow 21 is mixed with ambient air 2 before the mixture is fed as intake flow, via the compressor intake 3, to the gas turbine 6.

The example in FIG. 1 shows a gas turbine 6 with a single combustion chamber 4. Embodiments are also applicable, without limitation, for gas turbines with sequential combustion, as are known from EP0718470, for example.

Figure 2:
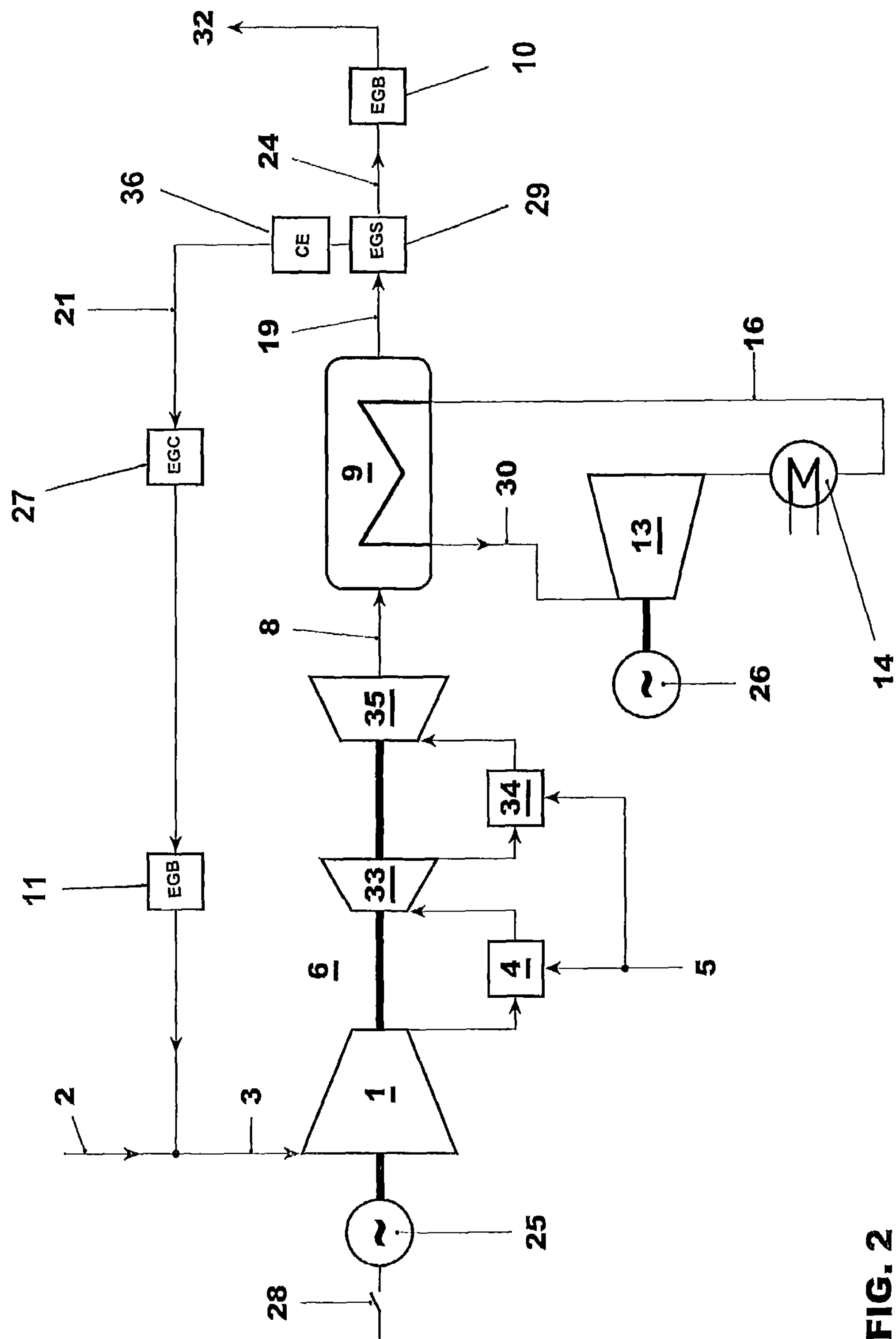
FIG. 2 shows a schematic view of an exemplary gas turbine power plant with a gas turbine with sequential combustion and recirculation of the exhaust gases.

In FIG. 2, an example of a gas turbine power plant with sequential combustion and exhaust gas recirculation is schematically shown. In this gas turbine, a high-pressure turbine 33 follows the combustion chamber 4. In the second combustion chamber 34, fuel 5 is once more added to the partially expanded exhaust gases—which perform work—of the high-pressure turbine 33 and combusted. The hot combustion gases of the second combustion chamber 34 are further expanded in the low-pressure turbine 35, performing work. The utilization of the waste heat and also recirculation are carried out in a similar way to the exemplary embodiment from FIG. 1. For controlling and shutting off the recirculation flow, a control element 36 is additionally provided, in addition to the exhaust gas splitter 29 which can be of a non-adjustable configuration.

Figure 3:
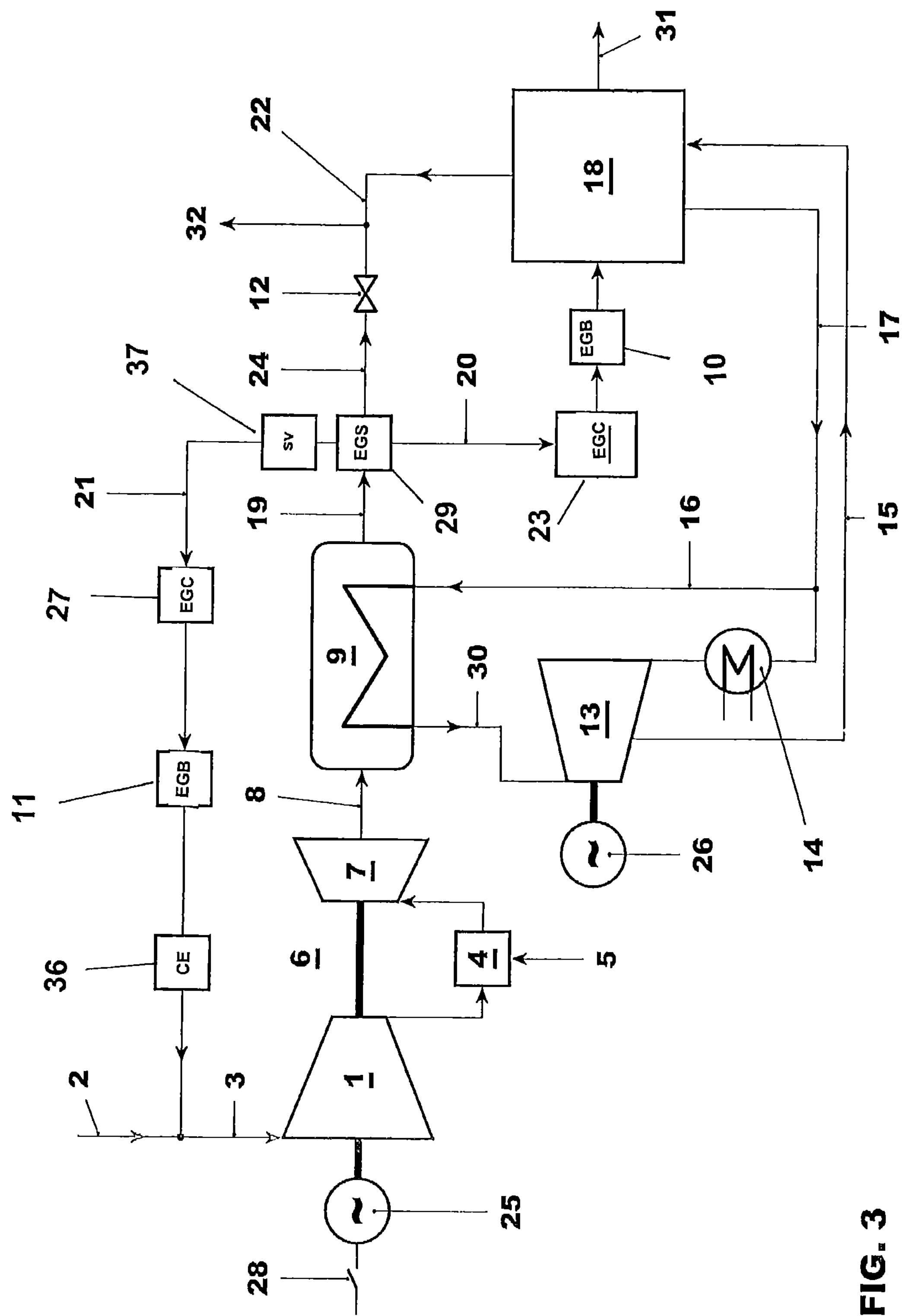
FIG. 3 shows a schematic view of an exemplary gas turbine power plant with a gas turbine with sequential combustion and recirculation of the exhaust gases and a carbon dioxide separation system.

In FIG. 3, based on FIG. 1, a carbon dioxide separation system 18 is additionally shown. The non-recirculated second exhaust gas partial flow 20 is, for example, additionally cooled in an exhaust gas recirculation cooler 23 and fed to the carbon dioxide separation system 18. From this, carbon dioxide-impoverished exhaust gases 22 are discharged to the environment via an exhaust stack 32. In order to overcome the pressure losses of the carbon dioxide separation system 18 and of the exhaust gas line, an exhaust gas blower 10 can be provided. The carbon dioxide 31 which is separated in the carbon dioxide separation system 18 is, for example, compressed in a compressor (not shown) and discharged for storage or further treatment. The carbon dioxide separation system 18, via a steam extraction 15, is supplied with steam, such as intermediate-pressure steam or low-pressure steam, which is tapped from the steam turbine 13. The steam is recirculated again to the water-steam cycle after yielding energy in the carbon dioxide separation system 18. In the depicted example, the steam is condensed and added to the feed water via the condensate return line 17.

The second exhaust gas partial flow can also be routed directly to the exhaust stack 32 via an exhaust gas bypass 24 which includes a bypass flap or valve.

In addition to the exemplary embodiment shown in FIG. 1, the exhaust gas recirculation system of the example shown in FIG. 3 additionally comprises a separate control element 36, for controlling the recirculation flow, and a fast-acting shutoff valve or a fast-acting shutoff flap 37.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Compressor
2 Ambient air
3 Compressor intake
4 Combustion chamber, first combustion chamber
5 Fuel
6 Gas turbine
7 Turbine
8 Hot gases of the gas turbine
9 Heat recovery steam generator (HRSG)
10 Exhaust gas blower for the second partial exhaust gas flow (to the carbon dioxide separation system or exhaust stack)
11 Exhaust gas blower for the first exhaust gas partial flow (exhaust gas recirculation)
12 Bypass flap or valve
13 Steam turbine
14 Condenser
15 Steam extraction for the carbon dioxide separation system
16 Feed-water line
17 Condensate return line
18 Carbon dioxide separation system
19 Exhaust gas from the heat recovery steam generator
20 Second exhaust gas partial flow (exhaust gas line to the carbon dioxide separation system)
21 First exhaust gas partial flow (exhaust gas recirculation)
22 Carbon dioxide-impoverished exhaust gas
23 Exhaust gas recirculation cooler (for the second exhaust gas partial flow)
24 Exhaust gas bypass to the exhaust stack
25 First generator
26 Second generator
27 Exhaust gas recirculation cooler (for the first exhaust gas partial flow)
28 Generator circuit-breaker
29 Exhaust gas splitter
30 Live steam
31 Separated carbon dioxide
32 Exhaust stack
33 High-pressure turbine
34 Second combustion chamber
35 Low-pressure turbine
36 Control element
37 Fast-acting shutoff valve or fast-acting shutoff flap
$P_{on}$ Engagement load
$P_{off}$ Disengagement load

What is claimed is:

1. A method for operating a gas turbine power plant having exhaust gas recirculation, a gas turbine, a heat recovery steam generator (HRSG) and an exhaust gas splitter which divides exhaust gases of the gas turbine power plant into a first exhaust gas flow, for recirculation into an intake flow of the gas turbine, and into a second exhaust gas flow, for discharge to an environment outside of the gas turbine, and also having a control element for controlling the first exhaust gas flow, the method comprising:

closing the control element until achieving a permissive condition in which an entire exhaust gas flow of the gas turbine power plant is discharged as the second exhaust gas flow to the environment;

opening the control element only after achieving the permissive condition in order to recirculate a portion of the exhaust gas as the first exhaust gas flow into the intake flow; and wherein the permissive condition depends on an operating state of the gas turbine, and wherein the permissive condition is an exceeding of an engagement load ($P_{on}$) of the gas turbine; and opening the control element for controlling the first exhaust gas flow only after exceeding of the engagement load ($P_{on}$) in order to recirculate the portion of the exhaust gas as the first exhaust gas flow into the intake flow.

2. The method as claimed in claim 1, comprising:

closing the control element when a disengagement condition is not reached; and discharging the entire exhaust gas flow of the gas turbine power plant as the second exhaust gas flow to the environment.

3. The method as claimed in claim 2, wherein the disengagement condition is not reaching a disengagement load ($P_{off}$).

4. The method as claimed in claim 3, wherein the disengagement load ($P_{off}$) is lower than the engagement load ($P_{on}$).

5. The method as claimed in claim 1, wherein the engagement load (Pon) is lower than, or equal to, a minimum load of the gas turbine, the method comprising:

opening the control element to recirculate the portion of the exhaust gases as the first exhaust gas flow into the intake flow as soon as a generator of the gas turbine is synchronized with a network; and a generator circuit-breaker is closed.

6. The method as claimed in claim 5, comprising:

closing the control element and discharging the entire exhaust gas flow of the gas turbine power plant as the second exhaust gas flow to the environment when the generator circuit-breaker opens.

7. The method as claimed in claim 1, comprising:

closing the control element in a time that is shorter than a time for exhaust gas which discharges from the gas turbine to flow through the HRSG.

8. The method for operating the gas turbine power plant with exhaust gas recirculation as claimed in claim 1, wherein the gas turbine includes a first and a second combustion chamber, the method comprising:

closing the control element before or during a shutdown of the second combustion chamber so that the entire exhaust gas flow of the gas turbine power plant is discharged as the second exhaust gas flow to the environment.

9. The method for operating the gas turbine power plant with exhaust gas recirculation as claimed in claim 1, wherein the gas turbine includes a first and a second combustion chamber, the method comprising:

closing the control element during oil operation of the gas turbine before purging oil lines of the fuel distribution system of the second combustion chamber so that during a purging process the entire exhaust gas flow of the gas turbine power plant is discharged as the second exhaust gas flow to the environment.

10. The method as claimed in claim 1, comprising:

closing the control element when a disengagement condition is not reached; and discharging the entire exhaust gas flow of the gas turbine power plant as the second exhaust gas flow to the environment.

11. The method as claimed in claim 10, comprising:

closing the control element when a circuit-breaker opens; and discharging the entire exhaust gas flow of the gas turbine power plant as the second exhaust gas flow to the environment.

12. The method as claimed in claim 11, comprising:

closing the control element in a time that is shorter than a time for exhaust gas which discharges from the gas turbine to flow through the HRSG.

13. The method for operating the gas turbine power plant with exhaust gas recirculation as claimed in claim 12, wherein the gas turbine includes a first and a second combustion chamber, the method comprising:

closing the control element before or during a shutdown of the second combustion chamber so that the entire exhaust gas flow of the gas turbine power plant is discharged as the second exhaust gas flow to the environment

14. The method for operating the gas turbine power plant with exhaust gas recirculation as claimed in 13, comprising:

closing the control element during oil operation of the gas turbine before purging oil lines of the fuel distribution system of the combustion chamber so that during a purging process the entire exhaust gas flow of the gas turbine power plant is discharged as the second exhaust gas flow to the environment.

15. The method for operating the gas turbine power plant with exhaust gas recirculation as claimed in claim 13, wherein the gas turbine includes a first and a second combustion chamber, the method comprising:

closing the control element during oil operation of the gas turbine before purging oil lines of the fuel distribution system of the second combustion chamber so that during a purging process the entire exhaust gas flow of the gas turbine power plant is discharged as the second exhaust gas flow to the environment.

16. A method for operating a gas turbine power plant having exhaust gas recirculation, a gas turbine, a heat recovery steam generator (HRSG) and an exhaust gas splitter which divides exhaust gases of the gas turbine power plant into a first exhaust gas flow, for recirculation into an intake flow of the gas turbine, and into a second exhaust gas flow, for discharge to an environment outside of the gas turbine, and also having a control element for controlling the first exhaust gas flow, the method comprising:

closing the control element until achieving a permissive condition in which an entire exhaust gas flow of the gas turbine power plant is discharged as the second exhaust gas flow to the environment;

opening the control element only after achieving the permissive condition in order to recirculate a portion of the exhaust gas as the first exhaust gas flow into the intake flow;

wherein the permissive condition depends on an operating state of the gas turbine; and closing the control element during oil operation of the gas turbine, before purging oil lines of the fuel distribution system of the combustion chamber so that during a purging process the entire exhaust gas flow of the gas turbine power plant is discharged as the second exhaust gas flow to the environment.

17. A method for operating a gas turbine power plant having exhaust gas recirculation, a gas turbine, a heat recovery steam generator (HRSG) and an exhaust gas splitter which divides exhaust gases of the gas turbine power plant into a first exhaust gas flow, for recirculation into an intake flow of the gas turbine, and into a second exhaust gas flow, for discharge to an environment outside of the gas turbine, and also having a control element for controlling the first exhaust gas flow, wherein the gas turbine comprises a compressor, a combustor, and a turbine, the method comprising:

holding the control element in a closed position until reaching a permissive condition in which an entire exhaust gas flow of the gas turbine power plant is discharged as the second exhaust gas flow to the environment;

opening the control element only after reaching the permissive condition in order to recirculate a portion of the exhaust gas as the first exhaust gas flow into the intake flow;

wherein the permissive condition depends on an operating state of the gas turbine; and wherein the control element is held in the closed position until one of the following permissive conditions of the gas turbine is reached:

exceeding of an engagement load (Pon);

exceeding a limit value of a hot gas pressure within the combustor or of a discharge pressure of the compressor;

exceeding a limit value of a temperature for a hot gas flow exhausted from the turbine;

exceeding a limit of a fuel mass flow; or exceeding, a degree of opening for fuel flow of a fuel control valve.

* * * * *